United States Patent
Liberman et al.

(10) Patent No.: US 12,062,105 B2
(45) Date of Patent: Aug. 13, 2024

(54) UTILIZING MULTIPLE STACKED MACHINE LEARNING MODELS TO DETECT DEEPFAKE CONTENT

(71) Applicant: Accenture Global Solutions Limited, Dublin (IE)

(72) Inventors: Neil Hayden Liberman, Arlington, VA (US); Leah Ding, North Potomac, MD (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 394 days.

(21) Appl. No.: 17/302,442

(22) Filed: May 3, 2021

(65) Prior Publication Data
US 2021/0406568 A1    Dec. 30, 2021

Related U.S. Application Data

(60) Provisional application No. 63/043,392, filed on Jun. 24, 2020.

(51) Int. Cl.
*G06Q 50/00*     (2024.01)
*G06F 18/214*    (2023.01)
(Continued)

(52) U.S. Cl.
CPC ....... *G06Q 50/265* (2013.01); *G06F 18/2148* (2023.01); *G06N 3/045* (2023.01);
(Continued)

(58) Field of Classification Search
CPC ........ G06N 3/045; G06N 20/00; G06N 3/047; G06T 2207/10016; G06T 7/11;
(Continued)

(56) References Cited

U.S. PATENT DOCUMENTS 10,904,488 B1 * 1/2021 Weisz ................ G06V 10/774
11,188,798 B1 * 11/2021 Goswami ................ G06N 3/08
(Continued)

OTHER PUBLICATIONS

Li et al., In Ictu Oculi: Exposing AI Generated Fake Face Videos by Detecting Eye Blinking, IEEE International Workshop on Information Forensics and Security (WIFS), pp. 1-7, Jun. 11 (Year: 2018).*
(Continued)

*Primary Examiner* — Ping Y Hsieh
*Assistant Examiner* — Xiao Liu
(74) *Attorney, Agent, or Firm* — Polsinelli PC

(57) ABSTRACT

A device may receive training data for training a first machine learning model, a second machine learning model, and a third machine learning model and may train the first machine learning model, the second machine learning model, and the third machine learning model with the training data. The device may receive input content and may process the input content, with the first machine learning model, the second machine learning model, and the third machine learning model, to generate a first model result, a second model result, and a third model result, respectively. The device may process the first model result, the second model result, and the third model result, with an aggregation model, to generate a detection result indicating whether the particular input content is a deepfake or is real and may perform one or more actions based on the detection result.

20 Claims, 10 Drawing Sheets

(51) Int. Cl.
| | |
|---|---|
| G06N 3/045 | (2023.01) |
| G06N 3/08 | (2023.01) |
| G06Q 20/38 | (2012.01) |
| G06Q 50/26 | (2012.01) |
| G06T 3/40 | (2006.01) |
| G06T 7/11 | (2017.01) |
| G06V 10/82 | (2022.01) |
| G06V 40/16 | (2022.01) |
| G06V 40/40 | (2022.01) |

(52) U.S. Cl.
CPC ........... *G06N 3/08* (2013.01); *G06Q 20/3821* (2013.01); *G06T 3/40* (2013.01); *G06T 7/11* (2017.01); *G06V 10/82* (2022.01); *G06V 40/171* (2022.01); *G06V 40/40* (2022.01); *G06T 2207/20081* (2013.01); *G06T 2207/20084* (2013.01); *G06T 2207/20132* (2013.01); *G06T 2207/30201* (2013.01)

(58) Field of Classification Search
CPC .................. G06T 7/73; G06T 2210/22; G06T 2207/20132; G06F 18/241; G06F 18/2415; G06F 18/2411; G06F 30/27; G06V 10/82; G06V 10/764; G06V 40/171; G06V 10/454; G06V 40/168; G06V 10/40; G06V 40/165; G06V 40/16; G06V 40/40; G06V 40/178; G06V 20/95; G06Q 20/4016; G06Q 50/265; G06Q 20/3821; G06Q 20/3674

See application file for complete search history.

(56) References Cited

U.S. PATENT DOCUMENTS

| | | | | |
|---|---|---|---|---|
| 11,611,550 | B1* | 3/2023 | Chavez | H04L 63/0853 |
| 2021/0097260 | A1* | 4/2021 | Verma | G06V 40/45 |
| 2021/0157872 | A1* | 5/2021 | David | G06F 40/279 |
| 2021/0173916 | A1* | 6/2021 | Ortiz | H04L 9/3213 |
| 2022/0121868 | A1* | 4/2022 | Chen | G06F 18/21 |

OTHER PUBLICATIONS

Y. Li, X. Yang, B. Wu, and S. Lyu, Hiding faces in plain sight: Disrupting ai face synthesis with adversarial perturbations, arXiv: 1906.09288 (Year: 2019).*

Wichiennit et al, Design and development of application for crime scene notification system, 10th International Conference on Ubi-media Computing and Workshops (Ubi-Media) pp. 1-6 (Year: 2017).*

Albahar et al, Deepfakes: Threats and countermeasures systematic review, Journal of Theoretical and Applied Information Technology, vol. 97. No. 22 (Year: 2019).*

Li et al, Exposing DeepFake Videos By Detecting Face Warping Artifacts, CVPRW (Year: 2019).*

Yu et al, Detecting deepfake-forged contents with separable convolutional neural network and image segmentation, 1912.12184 (Year: 2019).*

Samantha Cole, "This Deepfake of Mark Zuckerberg TestsFacebook's Fake Video Policies," Jun. 11, 2019, Website: https://www.vice.com/en/article/ywyxex/deepfake-of-mark-zuckerberg-facebook-fake-video-policy, 13 Pages.

Ravie Lakshmanan, "Fraudsters deepfake CEO's voice to trick manager into transferring $243,000," Sep. 2, 2019, Website: https://thenextweb.com/news/fraudsters-deepfake-ceos-voice-to-trick-manager-into-transferring-243000, 5 Pages.

Rossler et al., "FaceForensics++: Learning to Detect Manipulated Facial Images," Aug. 26, 2019, Proceedings of the IEEE International Conference on Computer Vision, 11 Pages.

Bayar et al., "A Deep Learning Approach To Universal Image Manipulation Detection Using A New Convolutional Layer," Jun. 20-23, 2016, Proceedings of the 4th ACM Workshop on Information Hiding and Multimedia Security, 6 Pages.

Xia et al., "Demoting Racial Bias in Hate Speech Detection," Jul. 30-Aug. 4, 2017, Proceedings of the 55th Annual Meeting of the Association for Computational Linguistics, pp. 7-14.

Taylor Synclair Goethe, "Bigotry Encoded: Racial Bias Intechnology," Mar. 2, 2019, Website: https://reporter.rit.edu/tech/bigotry-encoded-racial-bias-technology, 4 Pages.

Klare et al., "Face Recognition Performance: Role of Demographic Information," 2012, IEEE Transactions on Information Forensics and Security, 14 Pages.

Klare et al., "Pushing the Frontiers of Unconstrained Face Detection and Recognition: IARPA Janus Benchmark A," 2015, Proceedings of the IEEE conference on computer vision and pattern recognition, pp. 1931-1939.

Buolamwini et al., "Gender Shades: Intersectional Accuracy Disparities in Commercial Gender Classification," 2018, Conference on fairness, accountability and transparency, 15 Pages.

Li et al., "Celeb-DF: A Large-scale Challenging Dataset for DeepFake Forensics," Mar. 16, 2020, IEEE Conference on Computer Vision and Patten Recognition (CVPR), 10 Pages.

Guera et al., "Deepfake Video Detection Using Recurrent Neural Networks," 2018, 15th IEEE International Conference on Advanced Video and Signal Based Surveillance (AVSS), 6 Pages.

Yang et al., "Exposing Deep Fakes Using Inconsistent Head Poses," Nov. 13, 2018, ICASSP 2019-2019 IEEE International Conference on Acoustics Speech and Signal Processing (ICASSP), 4 Pages.

Zhou et al., "Two-Stream Neural Networks for Tampered Face Detection," Mar. 29, 2018, IEEE Conference on Computer Vision and Pattern Recognition Workshops (CVPRW), 9 Pages.

Li et al., "Exposing DeepFake Videos By Detecting FaceWarping Artifacts," May 22, 2019, arXiv preprint arXiv:1811.00656, 7 Pages.

Wang et al., "CNN-generated images are surprisingly easy to spot... for now," Apr. 4, 2020, arXiv preprint arXiv:1912.11035, 13 Pages.

Wu et al., "ManTra-Net: Manipulation Tracing Network For Detection And Localization of Image Forgeries With Anomalous Features," 2019, Proceedings of the IEEE Conference on Computer Vision and Pattern Recognition, pp. 9543-9552.

Li et al., "Face X-ray for More General Face Forgery Detection," Apr. 19, 2020, Proceedings of the IEEE/CVF Conference on Computer Vision and Pattern Recognition, 10 Pages.

Li et al., "In Ictu Oculi: Exposing AI Generated Fake Face Videos by Detecting Eye Blinking," Jun. 11, 2018, IEEE International Workshop on Information Forensics and Security (WIFS), 7 Pages.

* cited by examiner ically intelligence. Moreover, images and videos can be combined and superimposed onto source images or videos using artificial intelligence.
UTILIZING MULTIPLE STACKED MACHINE LEARNING MODELS TO DETECT DEEPFAKE CONTENT

CROSS-REFERENCE TO RELATED APPLICATION

This patent application claims priority to Provisional Patent Application No. 63/043,392, filed on Jun. 24, 2020, and entitled "UTILIZING MULTIPLE STACKED MACHINE LEARNING MODELS TO DETECT DEEPFAKE CONTENT." The disclosure of the prior application is considered part of and is incorporated by reference into this patent application.

BACKGROUND

Digital content (e.g., images, audio, video, and/or the like) can be manipulated with artificial intelligence-based solutions. For example, an image (e.g., a company's design sketches) can be manipulated by artificial intelligence (e.g., a deepfake model) to generate substantially similar images (e.g., designs) that infringe the company's design sketches. Audio can be manipulated by artificial intelligence for voice impersonation. Moreover, images and videos can be combined and superimposed onto source images or videos using artificial intelligence.

SUMMARY

In some implementations, a method may include receiving training data that includes input content for training machine learning models that include a first machine learning model, a second machine learning model, and a third machine learning model and preprocessing the training data to generate preprocessed training data. The method may include training the machine learning models, with the preprocessed training data, to generate trained machine learning models that include a first trained machine learning model, a second trained machine learning model, and a third trained machine learning model and receiving particular input content. The method may include processing the particular input content, with the first trained machine learning model, to generate a first model result, and processing the particular input content, with the second trained machine learning model, to generate a second model result. The method may include processing the particular input content, with the third trained machine learning model, to generate a third model result, and processing the first model result, the second model result, and the third model result, with an aggregation model, to generate a detection result indicating whether the particular input content is a deepfake or is real. The method may include performing one or more actions based on the detection result.

In some implementations, a device includes one or more memories and one or more processors to receive input content and process the input content, with a first machine learning model, to generate a first model result. The one or more processors may process the input content, with a second machine learning model, to generate a second model result, and may process the input content, with a third machine learning model, to generate a third model result. The one or more processors may process the first model result, the second model result, and the third model result, with an aggregation model, to generate a detection result indicating whether the input content is a deepfake or is real and may perform one or more actions based on the detection result.

In some implementations, a non-transitory computer-readable medium may store a set of instructions that includes one or more instructions that, when executed by one or more processors of a device, cause the device to receive input content and process the input content, with a first machine learning model, to generate a first model result. The one or more instructions may cause the device to process the input content, with a second machine learning model, to generate a second model result and process the input content, with a third machine learning model, to generate a third model result, wherein the first machine learning model, the second machine learning model, and the third machine learning are trained based on training data that includes preprocessed historical input content. The one or more instructions may cause the device to process the first model result, the second model result, and the third model result, with an aggregation model, to generate a detection result indicating whether the input content is a deepfake or is real and perform one or more actions based on the detection result.

DETAILED DESCRIPTION

Figure 1A:
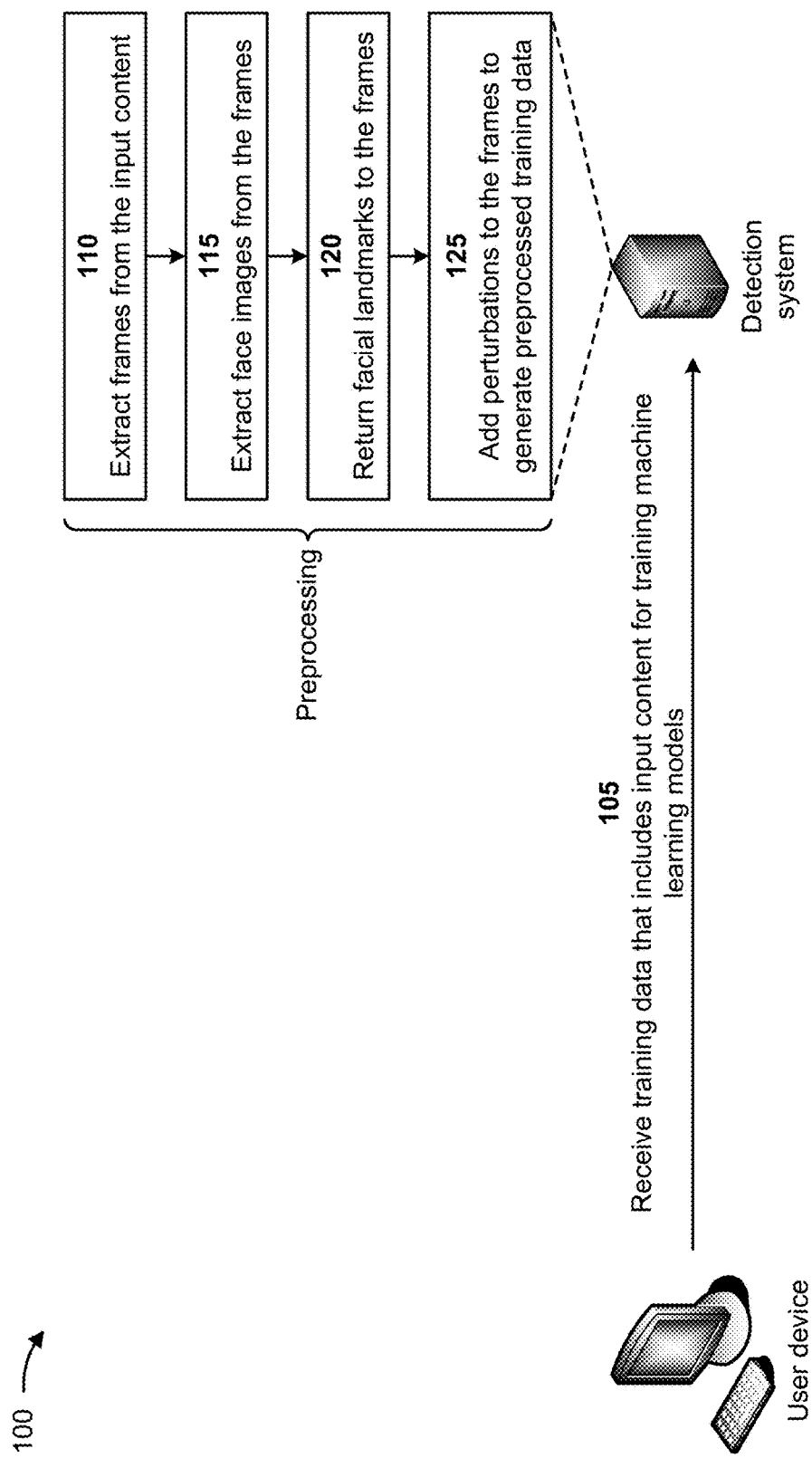
FIGS. 1A-1F are diagrams of an example implementation described herein.

The following detailed description of example implementations refers to the accompanying drawings. The same reference numbers in different drawings may identify the same or similar elements.

Digital content manipulation with artificial intelligence has been used to create fake celebrity videos, fake news, malicious hoaxes, and/or the like. A deepfake model is an artificial intelligence-based technology (e.g., deep learning technology) used to produce or alter digital content so that the digital content presents something that didn't, in fact, occur. Deepfake detection is the task of identifying manipulated faces in video or image format. These manipulations can be as subtle as a change to a facial expression or as drastic as a person's face being swapped with another face. While there have been models showing progress in this area, a major issue of deepfake detection is that of generalizability. It is a relatively simple task to achieve good accuracy on a set of training videos. However, it can be very difficult to achieve similar accuracy on test data. Furthermore, the task becomes increasingly difficult when analyzing forgeries generated from models that are not used in the training set.

Therefore, current deepfake detection techniques consume computing resources (e.g., processing resources, memory resources, communication resources, and/or the like), networking resources, and/or the like associated with providing less accurate deepfake determinations for digital content, correcting deepfake determinations for digital content, handling theft of proprietary information based on deepfake credentials, and/or the like.

Some implementations described herein relate to a detection system that utilizes multiple stacked machine learning models to detect deepfake content. For example, the detection system may receive training data that includes input content for training machine learning models that include a first machine learning model, a second machine learning model, and a third machine learning model and may preprocess the training data to generate preprocessed training data. The method may include training the machine learning models, with the preprocessed training data, to generate trained machine learning models that include a first trained machine learning model, a second trained machine learning model, and a third trained machine learning model and receiving particular input content. The method may include processing the particular input content, with the first trained machine learning model, to generate a first model result, and processing the particular input content, with the second trained machine learning model, to generate a second model result. The method may include processing the particular input content, with the third trained machine learning model, to generate a third model result, and processing the first model result, the second model result, and the third model result, with an aggregation model, to generate a detection result indicating whether the particular input content is a deepfake or is real. The method may include performing one or more actions based on the detection result.

In this way, the detection system utilizes multiple stacked machine learning models to detect deepfake content. The detection system may utilize numerous machine learning models that provide different detection methods that are then aggregated into a single model that outputs a binary classification of content as real or fake. Additionally, the detection system utilizes added perturbations to content which may lead to generalization improvements. This, in turn, conserves computing resources, networking resources, and/or the like that would otherwise have been consumed in providing less accurate deepfake determinations for digital content, correcting deepfake determinations for digital content, handling theft of proprietary information based on deepfake credentials, and/or the like.

FIGS. 1A-1F are diagrams of an example 100 associated with utilizing multiple stacked machine learning models to detect deepfake content. As shown in FIGS. 1A-1F, example 100 includes a user device and a detection system. The user device may include a desktop computer, a mobile telephone, a virtual reality device, wearable communication device, a laptop computer, and/or the like associated with a user. The detection system may include a system that utilizes multiple stacked machine learning models to detect deepfake content. Further details of the user device and the detection system are provided elsewhere herein.

As shown in FIG. 1A, and by reference number 105, the detection system may receive training data that includes input content (e.g., images, videos, audio, and/or the like) for training machine learning models. For example, the detection system may receive the training data from the user device or from one or more other devices. The training data may include a first group of historical content that has been manipulated via a deepfake model, a second group of historical content that has not been manipulated via a deepfake model, and/or the like. For example, the training data may include a first group of historical videos where some or all of the frames of the first group have been manipulated via a deepfake model, a second group of historical videos where some or all of the frames of the second group have been manipulated via a deepfake model, and/or the like.

As further shown in FIG. 1A, the detection system may preprocess the input content of the training data so that the detection system may analyze each frame of the input content before aggregating image results into a single deepfake prediction. For example, as shown by reference number 110, the detection system may extract frames from the input content. If the input content includes videos, each video may include multiple frames (e.g., images) that, together, constitute each video. Thus, the detection system may extract the multiple frames from each video to generate multiple frames (e.g., multiple images).

As further shown in FIG. 1A, and by reference number 115, the detection system may extract face images from the frames of the input content. Because a deepfake may be designed to alter an image of a face, the detection system may utilize the extracted face images from frames rather than the entire frames. In some implementations, a class breakdown of the training data may not be inherently balanced (e.g., with more deepfake videos than real unmanipulated videos), so the detection system may artificially balance the training data by utilizing more frames from the real videos than frames from the deepfake videos. After extracting the face images from the frames of the input content, the detection system may resize the face images to input dimensions necessary for the machine learning models.

As further shown in FIG. 1A, and by reference number 120, the detection system may return facial landmarks to the frames. For example, the detection system may return the facial landmarks to the extracted face images. In some implementations, the detection system may utilize a library of landmarks to return the facial landmarks to the extracted face images. With the facial landmarks, the detection system may locate chin areas of the face images and may extract portions (e.g., a square areas) of the chin areas as input for one or more of the machine learning models.

As further shown in FIG. 1A, and by reference number 125, the detection system may add perturbations to the frames (e.g., to the extracted face images and after returning the facial landmarks to the extracted face images) to generate preprocessed training data. Adding small perturbations to test data may lead to a significant loss of performance for many deepfake models. For this reason, the detection system may add the perturbations to the training data. For example, the detection system may add first perturbations to the training data by cropping outer pixels of the extracted face images and replacing the outer pixels with a border (e.g., a black colored border). The cropping of the outer pixels may result in images that sometimes cut off minor portions of faces. However, useful information is not lost by cropping the outer pixels since manipulations of face images almost always occur around noses, eyes, and/or mouths, which should be located centrally in the face images for people facing a camera. The detection system may add second perturbations to the training data by cropping outer pixels of the extracted face images and stretching the face images to a predetermined input size. This may create slightly different face images from the original uncropped face images but may lower qualities of the face images and may increase a variability of the training data. In some implementations, the detection system may add the first and second perturbations to a random quantity (e.g., ten percent, twenty percent, and/or the like) of the face images.

Figure 1B:
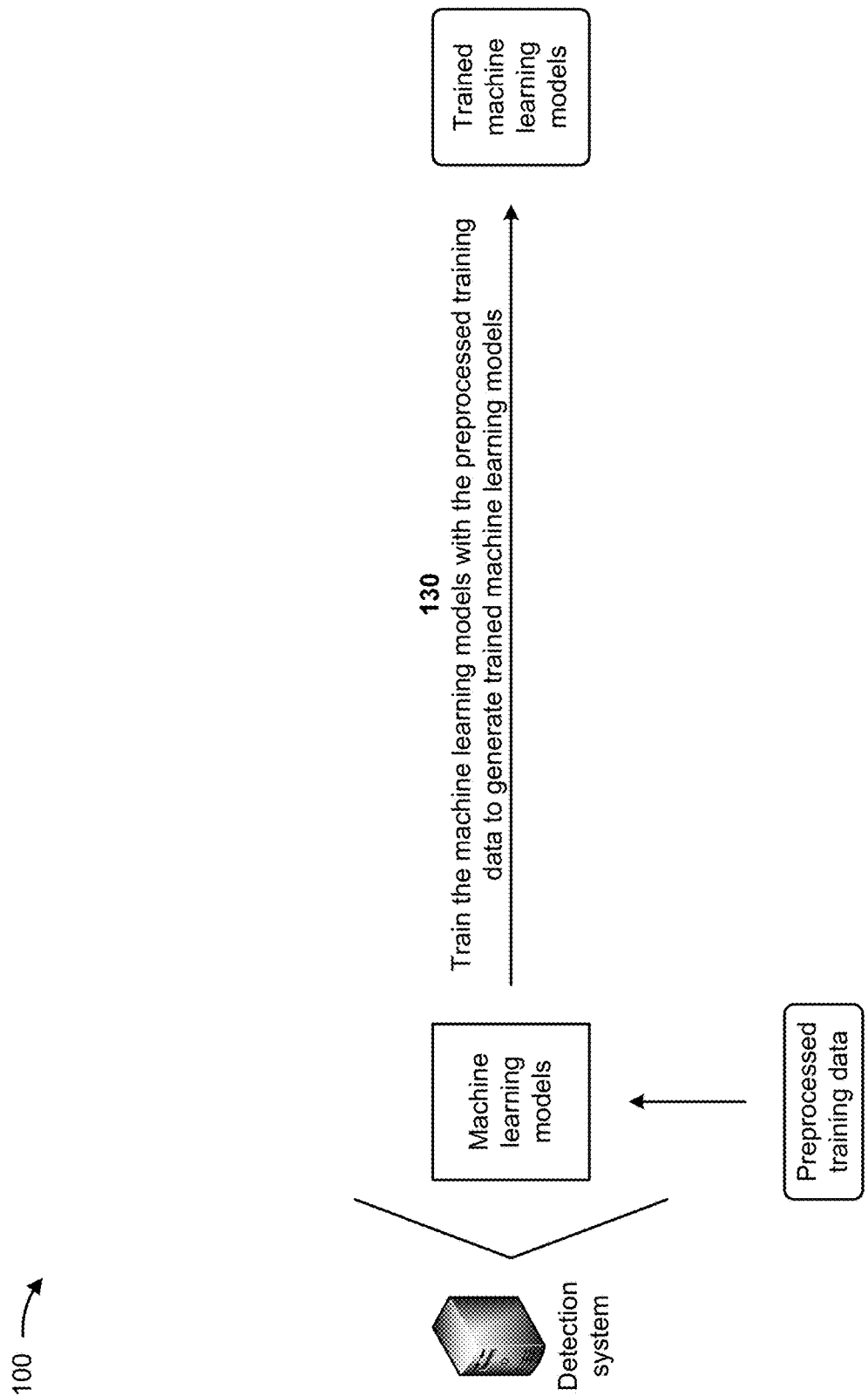

As shown in FIG. 1B, and by reference number 130, the detection system may train the machine learning models, with the preprocessed training data, to generate trained machine learning models. For example, the detection system may train a first machine learning model, a second machine learning model, and a third machine learning model, with the preprocessed training data, to generate a first trained machine learning model, a second trained machine learning model, and a third trained machine learning model, respectively. In some implementations, the detection system may concurrently train the first machine learning model, the second machine learning model, and the third machine learning model with the preprocessed training data; may sequentially train the first machine learning model, the second machine learning model, and the third machine learning model with the preprocessed training data; and/or the like. Prior to training the machine learning models, the detection system may label the preprocessed training data. For example, the detection system may label the extracted face images from real videos as "real," may label the extracted face images from fake videos as "fake," and/or the like.

The first machine learning model may include a convolutional neural network (CNN) model, referred to as a full-face image CNN model. The detection system may utilize the labeled training data with the full-face CNN model to determine classifications for the training data (e.g., real (or not a deepfake), a deepfake, and/or the like).

The second machine learning model may include a CNN model, referred to as a partial image CNN model. The partial image CNN model may be a variation of the full-face image CNN model. Because blending is a universal step in creating deepfakes, focusing on a partial area (e.g., a chin of a face image) improves generalization of the partial image CNN model. The chin may be utilized as the partial area of focus since blending always occurs in the chin area. Furthermore, a first type of deepfake is a face swap of two people, where blending occurs throughout many different regions of a face image. A second type of deepfake is an alteration of a facial expression or mouth movement, which is a much more subtle deepfake that may not encompass as much blending around the entire face image as the face swap. Thus, blending is expected to occur near a mouth or chin of a face image and the partial image CNN model may detect such blending.

The third machine learning model may include a support vector machine (SVM) learning model, referred to as a blur SVM learning model. Many fake images contain regions of faces that are sharp while other regions of the faces are blurred. The detection system may evaluate a level of blur across different regions of a face and may calculate a difference between neighboring regions. The detection system may utilize a Laplacian variance to compute levels of blur for different regions and may calculate the differences between a current region and neighboring regions based on the computed levels of blur. The detection system may utilize the differences to compute a mean, a median, and a standard deviation as features for the SVM learning model. The detection system may also calculate differences between individual pixel values (e.g., by comparing each pixel value to neighboring pixel values) and may utilize the differences to calculate a mean, a median, and a standard deviation as features for the SVM learning model.

Figure 1C:
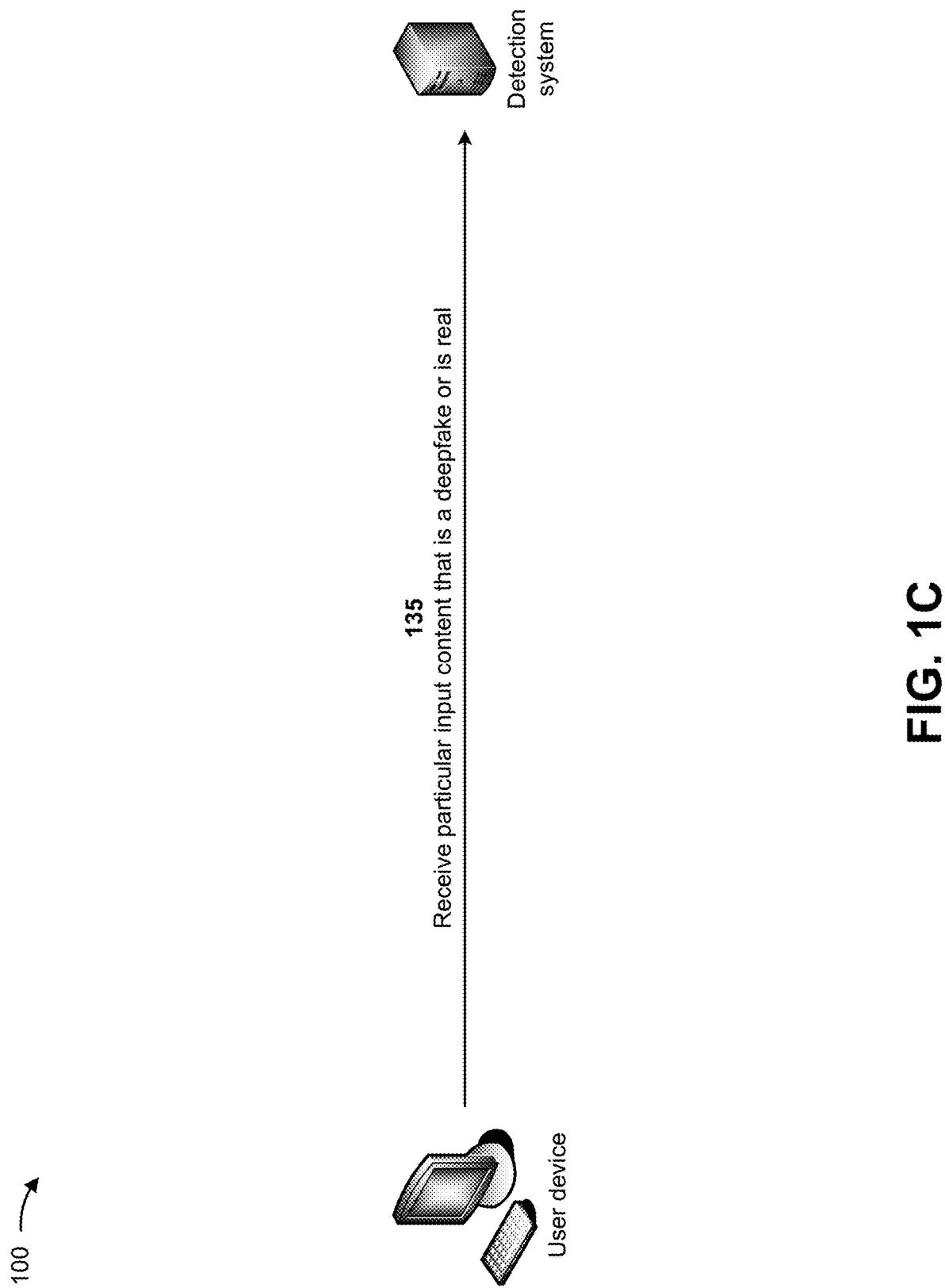

As shown in FIG. 1C, and by reference number 135, the detection system may receive particular input content that is a deepfake or is real (e.g., not a deepfake). For example, the detection system may receive the particular input content from the user device. The particular input content may include a video, one or more images, audio data, and/or the like. In some implementations, the detection system receives the particular input content as part of a request for a determination of whether the particular input content is a deepfake or is real.

Figure 1D:
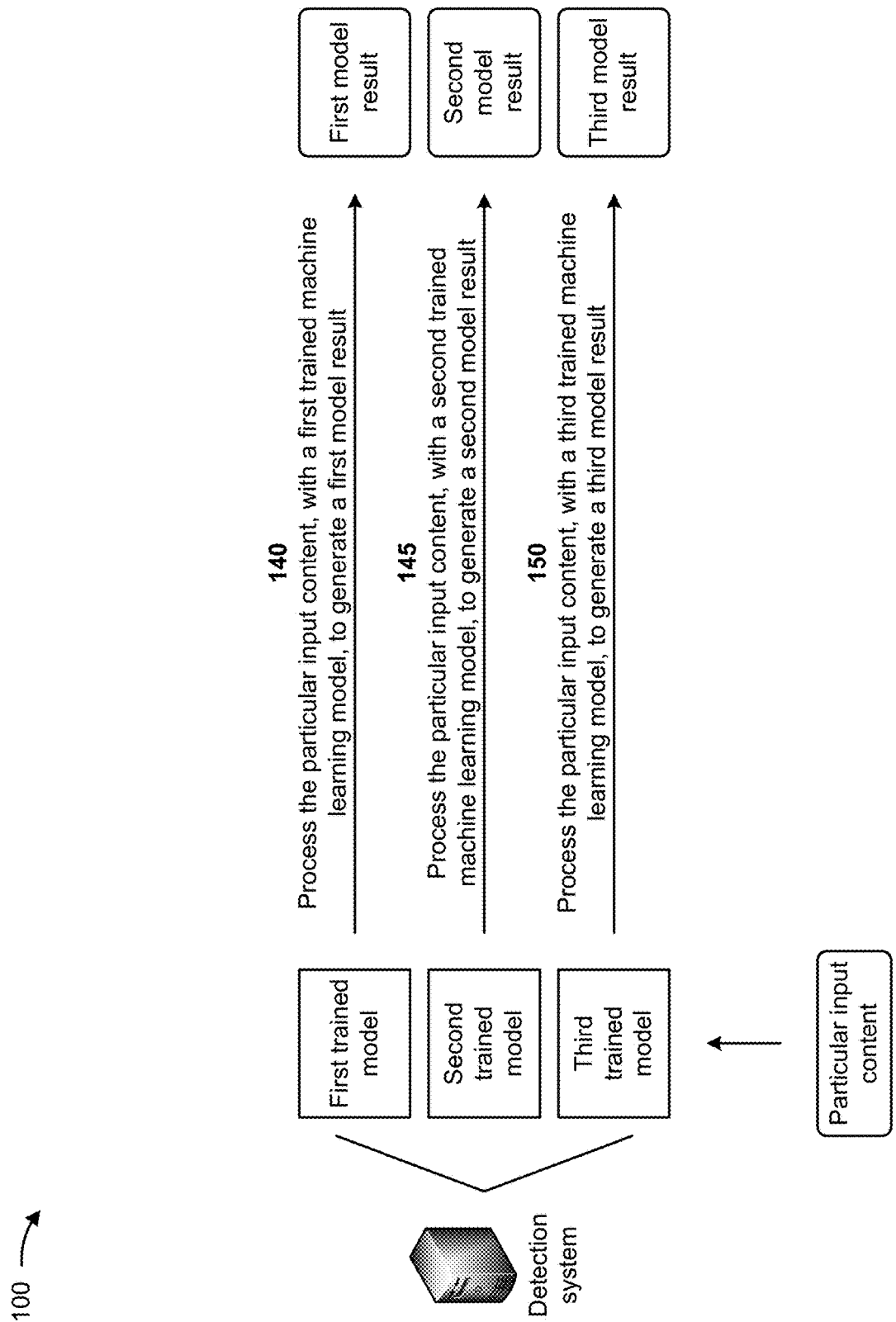

As shown in FIG. 1D, and by reference number 140, the detection system may process the particular input content, with the first trained machine learning model, to generate a first model result. The first model result may include an indication of whether the particular input content is a deepfake or is real (e.g., not a deepfake). In some implementations, the first model result includes a probability that the particular input content is a deepfake.

As further shown in FIG. 1D, and by reference number 145, the detection system may process the particular input content, with the second trained machine learning model, to generate a second model result. The second model result may include an indication of whether the particular input content is a deepfake or is real (e.g., not a deepfake). In some implementations, the second model result includes a probability that the particular input content is a deepfake.

As further shown in FIG. 1D, and by reference number 150, the detection system may process the particular input content, with the third trained machine learning model, to generate a third model result. The third model result may include an indication of whether the particular input content is a deepfake or is real (e.g., not a deepfake). In some implementations, the third trained machine learning model processes the particular input content to generate a plurality of binary predictions that the input content is a deepfake. The third trained machine learning model may average the plurality of binary predictions to determine a probability that the particular input content is a deepfake. The third model result may correspond to the probability that the particular input content is a deepfake.

In some implementations, the detection system may concurrently process the particular input content with the first trained machine learning model, the second trained machine learning model, and the third trained machine learning model; may sequentially process the particular input content with the first trained machine learning model, the second trained machine learning model, and the third trained machine learning model; and/or the like.

Figure 1E:
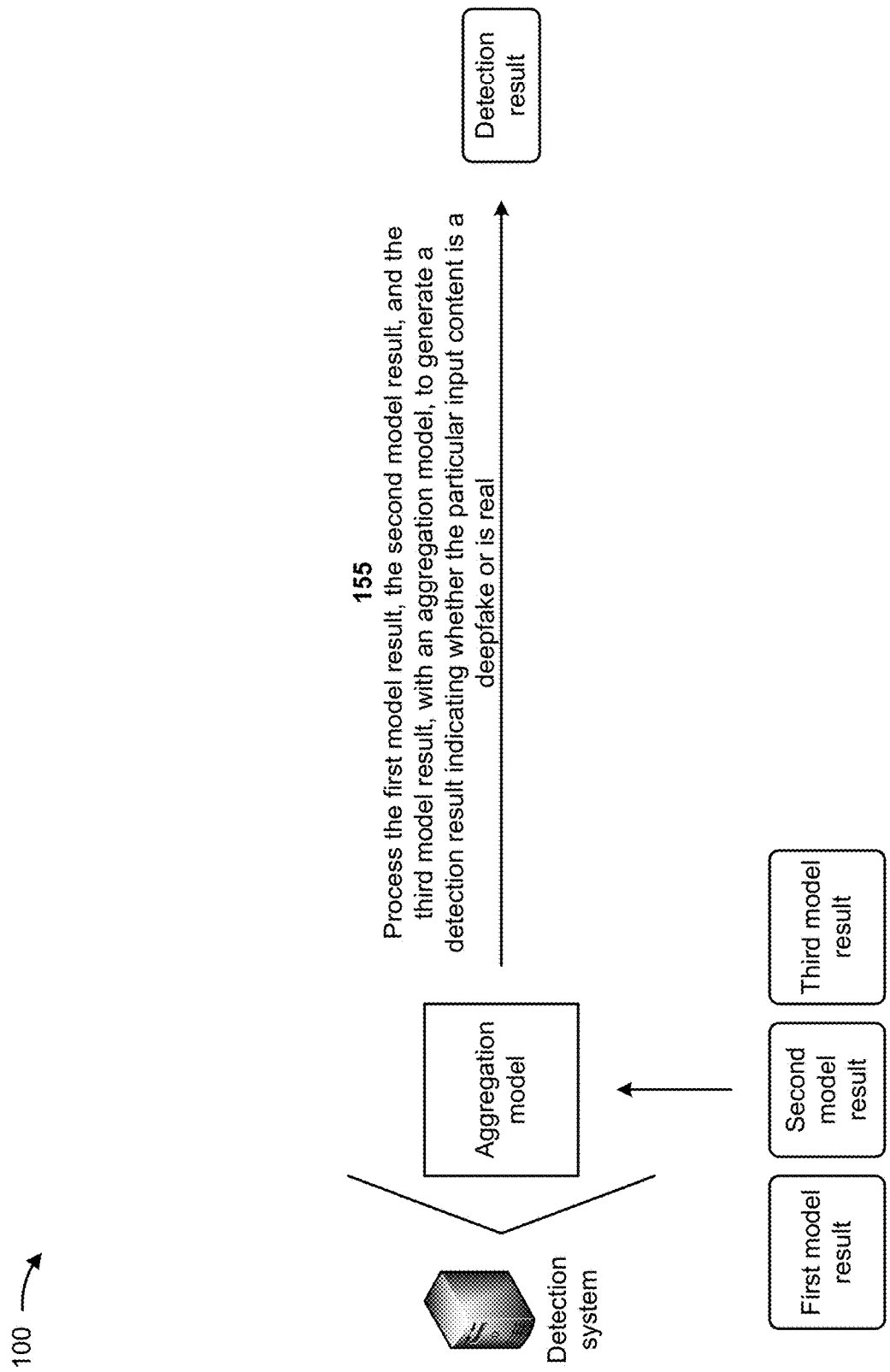

As shown in FIG. 1E, and by reference number 155, the detection system may process the first model result, the second model result, and the third model result, with an aggregation model, to generate a detection result indicating whether the particular input content is a deepfake or is real (e.g., not a deepfake). The aggregation model may include a logistic regression machine learning model. In some implementations, the detection result is a final probability that the particular input content is a deepfake. The final probability may be determined based on a first probability that the particular input content is a deepfake (e.g., generated by the first trained machine learning model), a second probability that the particular input content is a deepfake (e.g., generated by the second trained machine learning model), and a third probability that the particular input content is a deepfake (e.g., generated by the third trained machine learning model). In some implementations, the detection result is a binary result with a first value indicating that the particular input content is a deepfake and a second value indicating that the particular input content is real.

Figure 1F:
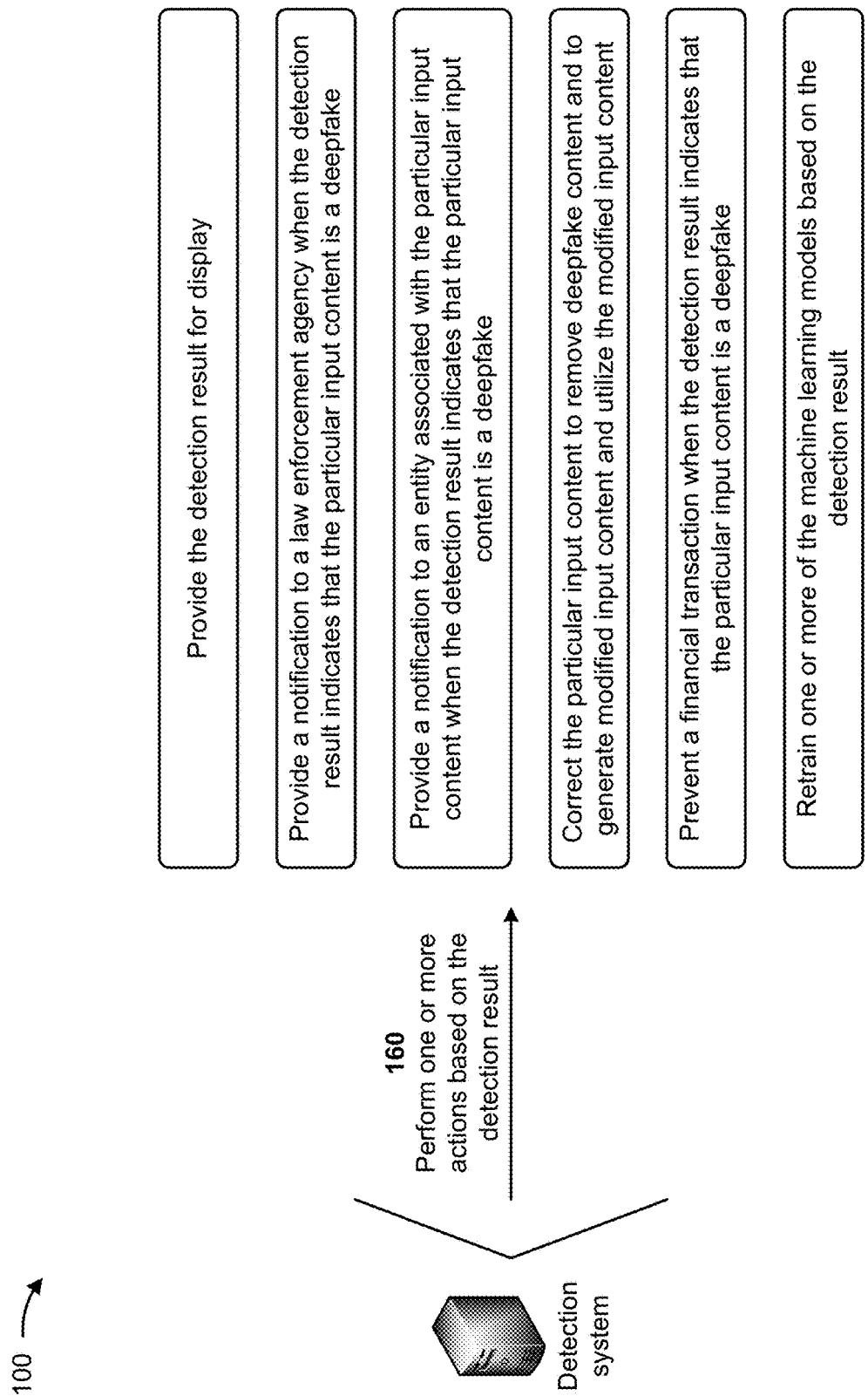

As shown in FIG. 1F, and by reference number 160, the detection system may perform one or more actions based on the detection result. In some implementations, the one or more actions include the detection system providing the detection result for display. For example, the detection system may provide the detection result to the user device and the user device may display the detection result to a user of the user device. The user may utilize the detection result to block the particular input content, modify the particular input content, and/or take another appropriate action with respect to the particular input content. In this way, the detection system conserves computing resources, networking resources, and/or the like that would otherwise have been consumed in providing less accurate deepfake determinations for the particular input content, correcting deepfake determinations for the particular input content, and/or the like.

In some implementations, the one or more actions include the detection system generating and providing a notification to a law enforcement agency when the detection result indicates that the particular input content is a deepfake. For example, when the detection result indicates that the particular input content is a deepfake, the detection system may provide a notification to a device associated with the law enforcement agency so that the law enforcement agency may take appropriate action against a creator of the particular input content. In this way, the detection system conserves computing resources, networking resources, and/or the like that would otherwise have been consumed in handling theft of proprietary information based on deepfake credentials, handling legal ramifications of the particular input content, and/or the like.

In some implementations, the one or more actions include the detection system generating and providing a notification to an entity associated with the particular input content when the detection result indicates that the particular input content is a deepfake. For example, when the detection result indicates that the particular input content is a deepfake, the detection system may provide a notification to the entity associated with the particular input content so that the entity may block the particular input content, modify the particular input content, and/or take another appropriate action with respect to the particular input content. In this way, the detection system conserves computing resources, networking resources, and/or the like that would otherwise have been consumed in providing less accurate deepfake determinations for the particular input content, correcting deepfake determinations for the particular input content, and/or the like.

In some implementations, the one or more actions include the detection system correcting the particular input content to remove deepfake content and to generate modified input content, and utilizing the modified input content. For example, if the particular input content is to be provided on a website, the detection system may correct the particular input content to generate the modified input content, and may provide the modified input content to the website. In this way, the detection system conserves computing resources, networking resources, and/or the like that would otherwise have been consumed in providing less accurate deepfake determinations for the particular input content, correcting deepfake determinations for the particular input content, and/or the like.

In some implementations, the one or more actions include the detection system preventing a financial transaction when the detection result indicates that the particular input content is a deepfake of a credential required for performing the financial transaction. For example, the particular input content may include a face image that is to be provided to verify a user for performance of the financial transaction. When the detection result indicates that the face image is a deepfake, the detection system may prevent the financial transaction from occurring and may notify a law enforcement agency about the attempted financial fraud. In this way, the detection system conserves computing resources, networking resources, and/or the like that would otherwise have been consumed in handling financial fraud based on deepfake credentials, handling legal ramifications of the financial fraud, and/or the like.

In some implementations, the one or more actions include the detection system retraining one or more of the machine learning models based on the detection result. The detection system may utilize the detection result as additional training data for retraining the one or more of the machine learning models, thereby increasing the quantity of training data available for training the one or more of the machine learning models. Accordingly, the detection system may conserve computing resources associated with identifying, obtaining, and/or generating historical data for training the one or more of the machine learning models relative to other systems for identifying, obtaining, and/or generating historical data for training machine learning models.

In this way, the detection system utilizes multiple stacked machine learning models to detect deepfake content. The detection system may utilize numerous machine learning models that provide different detection methods that are then aggregated into a single model that outputs a binary classification of content as real or fake. Additionally, the detection system utilizes added perturbations to content which may lead to generalization improvements. This, in turn, conserves computing resources, networking resources, and/or the like that would otherwise have been consumed in providing less accurate deepfake determinations for digital content, correcting deepfake determinations for digital content, handling theft of proprietary information based on deepfake credentials, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
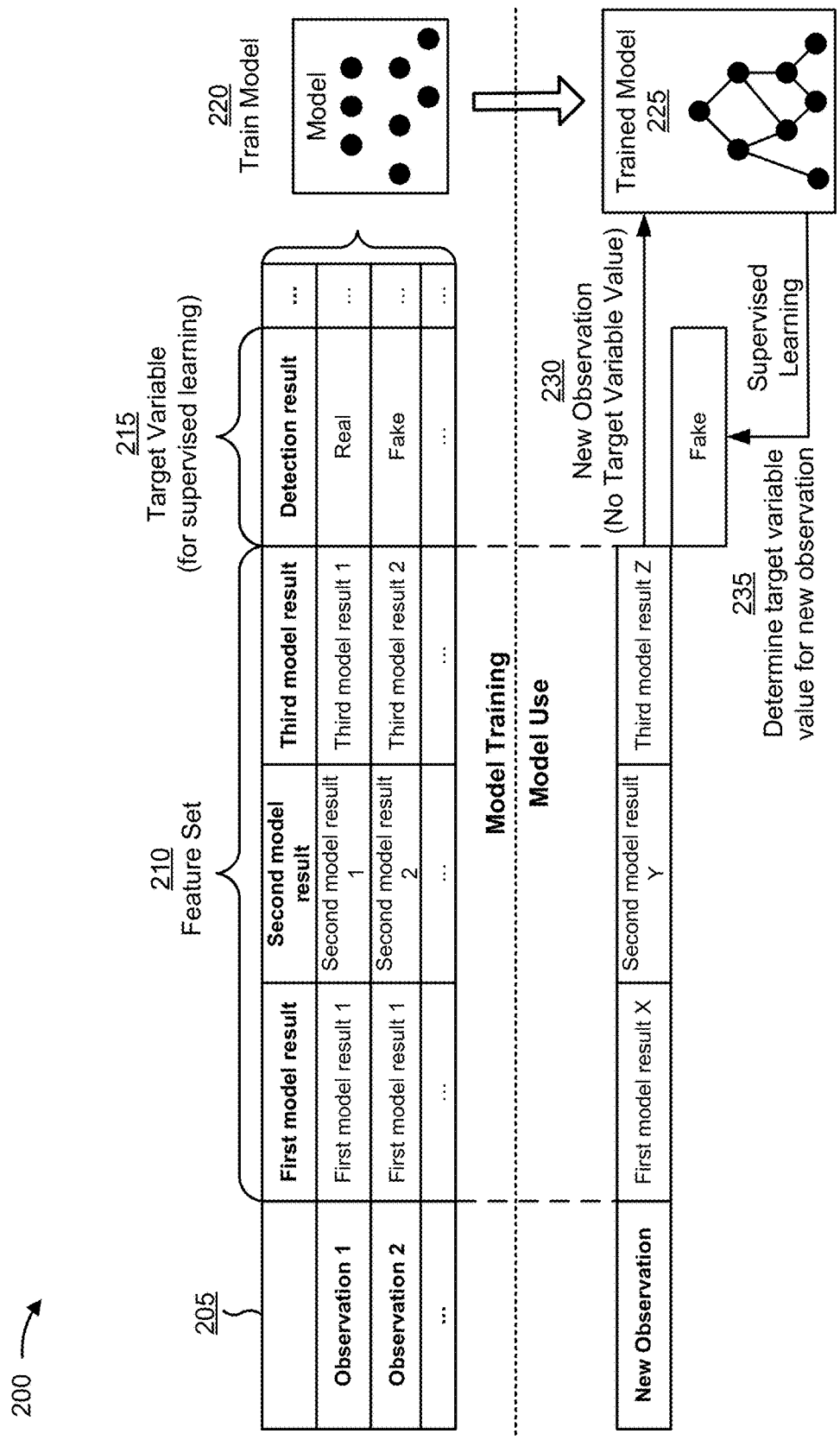
FIG. 2 is a diagram illustrating an example of training and using a machine learning model in connection with detecting deepfake content.

FIG. 2 is a diagram illustrating an example 200 of training and using a machine learning model (e.g., the machine learning models or the aggregation model) in connection with detecting deepfake content. The machine learning model training and usage described herein may be performed using a machine learning system. The machine learning system may include or may be included in a computing device, a server, a cloud computing environment, and/or the like, such as the detection system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the detection system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the detection system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a first model result, a second feature of a second model result, a third feature of a third model result, and so on. As shown, for a first observation, the first feature may have a value of first model result 1, the second feature may have a value of second model result 1, the third feature may have a value of third model result 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a detection result, which has a value of real for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first model result X, a second feature of second model result Y, a third feature of third model result Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of fake for the target variable of the detection result for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first model result cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second model result cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect deepfake content. The machine learning system enables recognition and/or identification of tens, hundreds, thousands, or millions of features and/or feature values for tens, hundreds, thousands, or millions of observations, thereby increasing accuracy and consistency and reducing delay associated with detecting deepfake content relative to requiring computing resources to be allocated for tens, hundreds, or thousands of operators to manually detect deepfake content.

As indicated above, FIG. 2 is provided as an example. Other examples may differ from what is described in connection with FIG. 2.

Figure 3:
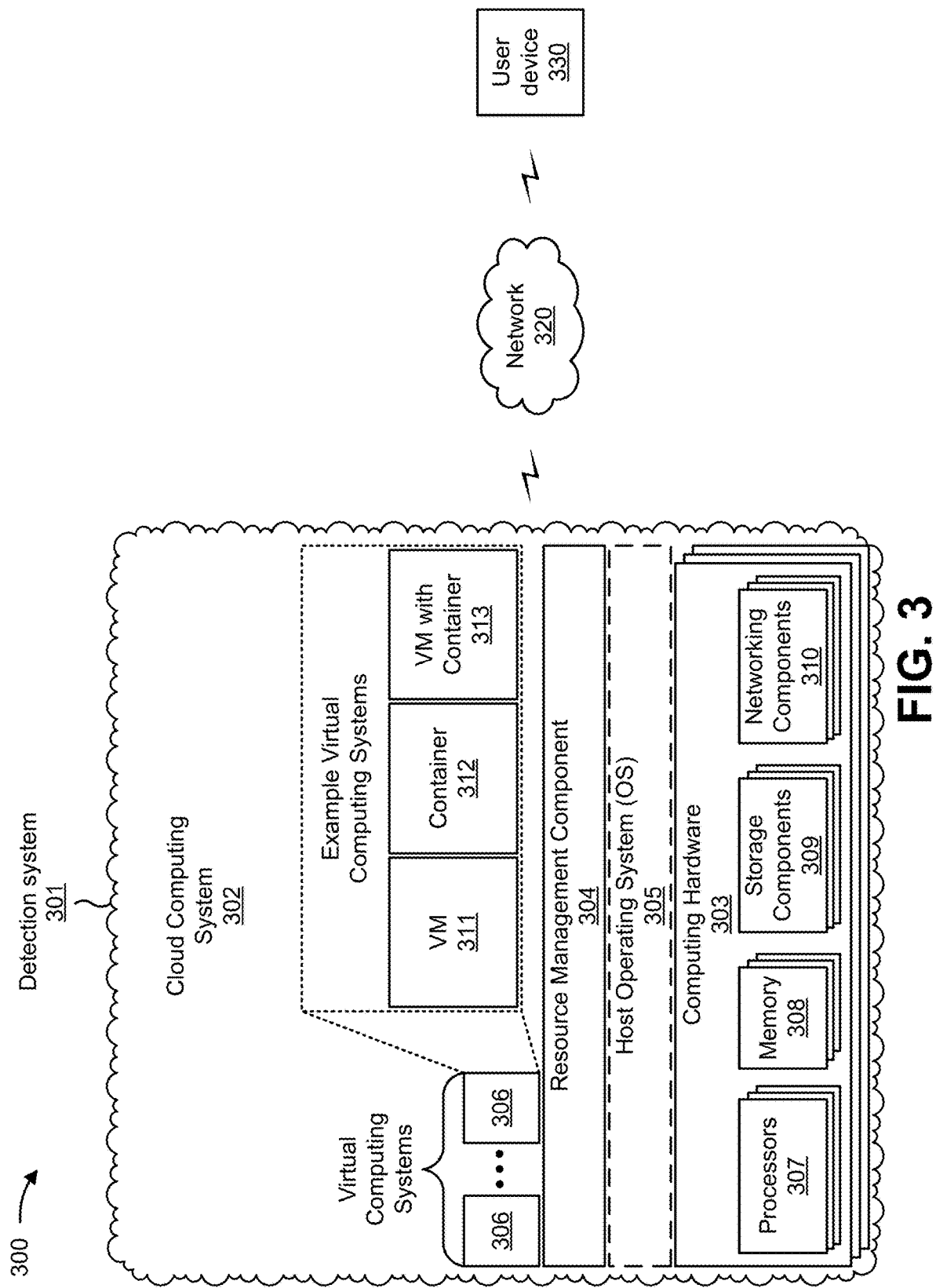
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a detection system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the detection system 301 may include one or more elements 303-313 of the cloud computing system 302, may execute within the cloud computing system 302, and/or may be hosted within the cloud computing system 302, in some implementations, the detection system 301 may not be cloud-based (e.g., may be implemented outside of a cloud computing system) or may be partially cloud-based. For example, the detection system 301 may include one or more devices that are not part of the cloud computing system 302, such as device 400 of FIG. 4, which may include a stand-alone server or another type of computing device. The detection system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
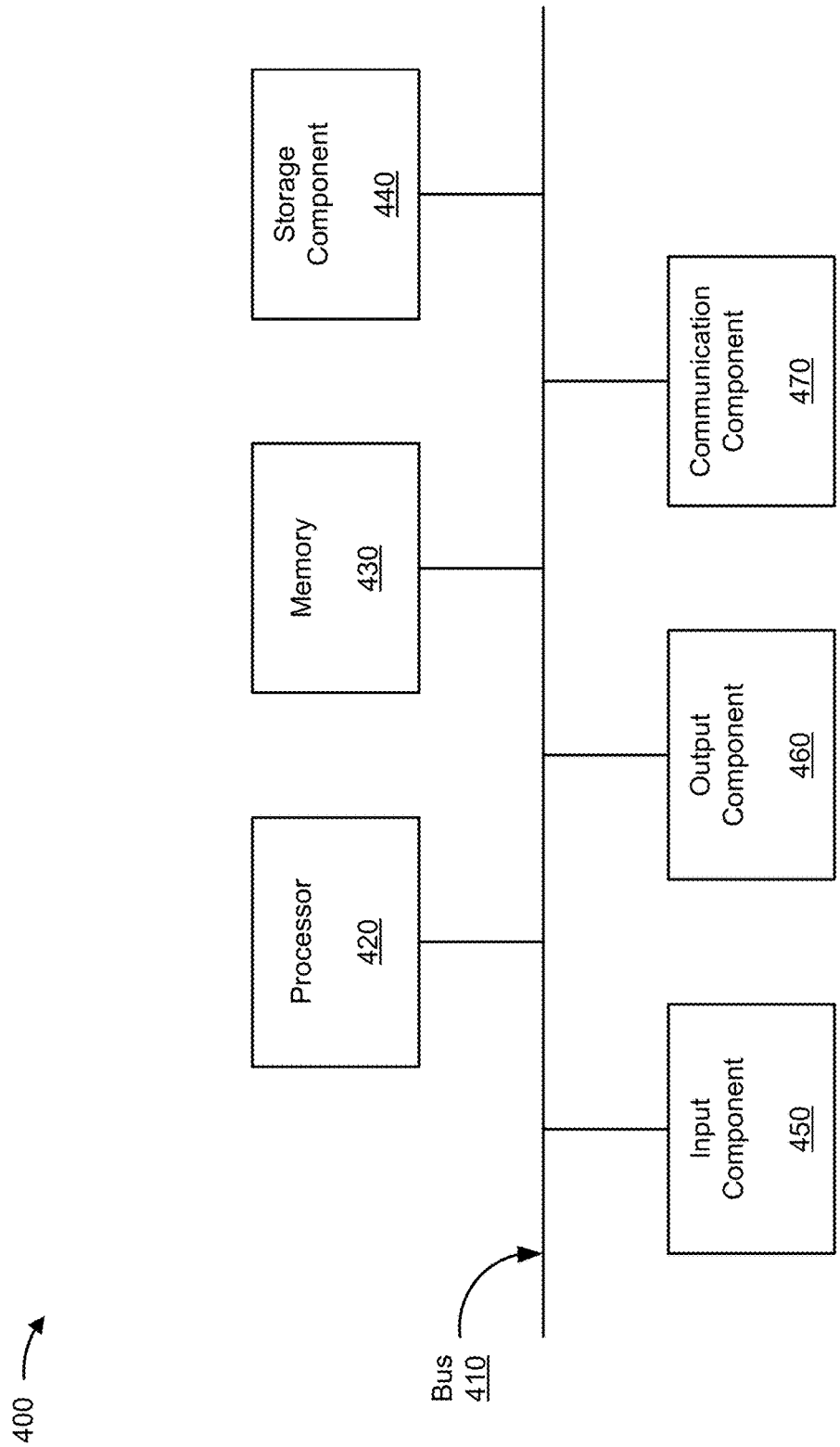
FIG. 4 is a diagram of example components of one or more devices of FIG. 3.

FIG. 4 is a diagram of example components of a device 400, which may correspond to detection system 301 and/or user device 330. In some implementations, detection system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
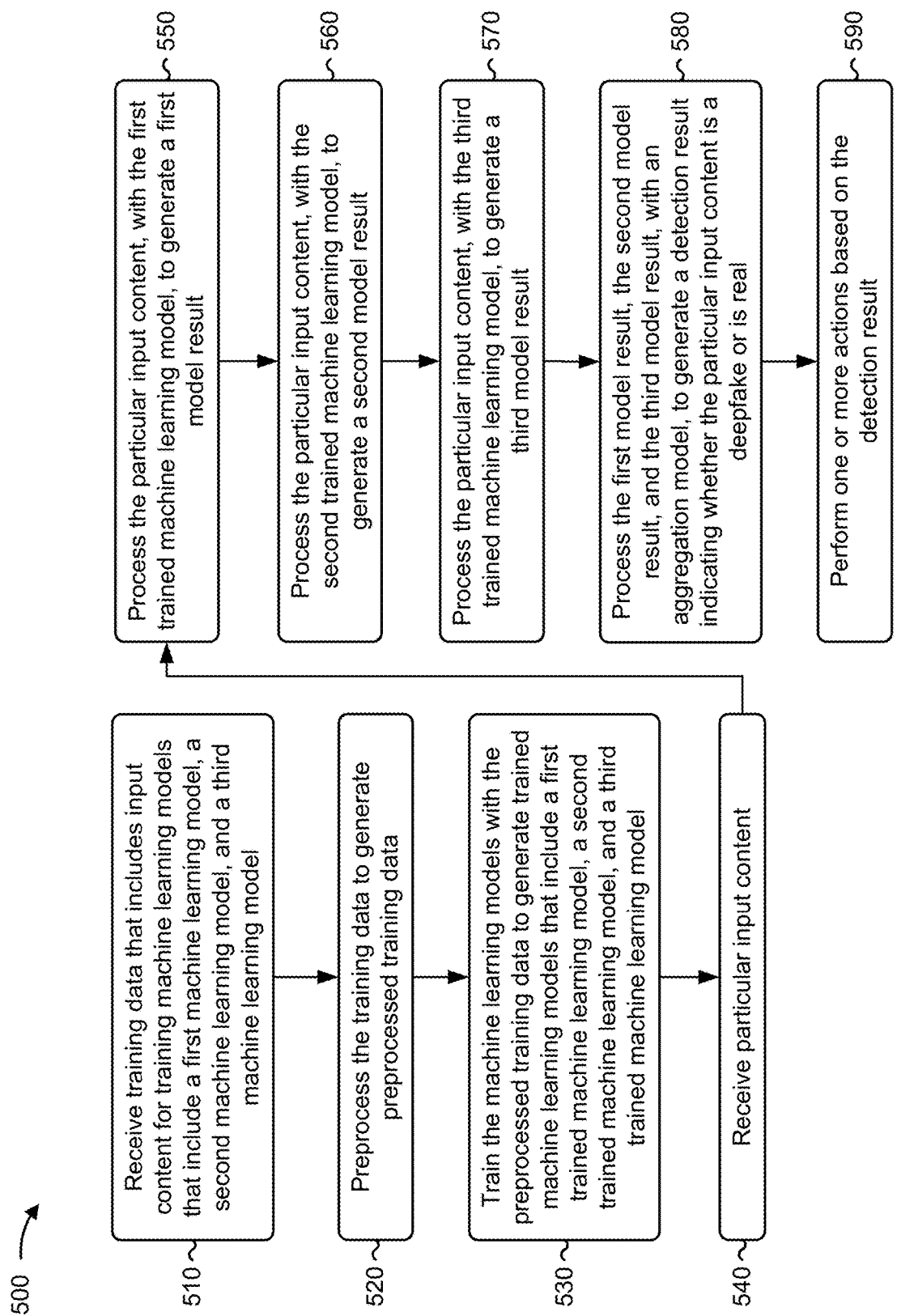
FIG. 5 is a flowchart of an example process for utilizing multiple stacked machine learning models to detect deepfake content.

FIG. 5 is a flowchart of an example process 500 for utilizing multiple stacked machine learning models to detect deepfake content. In some implementations, one or more process blocks of FIG. 5 may be performed by a device (e.g., detection system 301). In some implementations, one or more process blocks of FIG. 5 may be performed by another device or a group of devices separate from or including the device, such as a user device (e.g., user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving training data that includes input content for training machine learning models that include a first machine learning model, a second machine learning model, and a third machine learning model (block 510). For example, the device may receive training data that includes input content for training machine learning models that include a first machine learning model, a second machine learning model, and a third machine learning model, as described above.

As further shown in FIG. 5, process 500 may include preprocessing the training data to generate preprocessed training data (block 520). For example, the device may preprocess the training data to generate preprocessed training data, as described above.

As further shown in FIG. 5, process 500 may include training the machine learning models, with the preprocessed training data, to generate trained machine learning models that include a first trained machine learning model, a second trained machine learning model, and a third trained machine learning model (block 530). For example, the device may train the machine learning models, with the preprocessed training data, to generate trained machine learning models that include a first trained machine learning model, a second trained machine learning model, and a third trained machine learning model, as described above.

As further shown in FIG. 5, process 500 may include receiving particular input content (block 540). For example, the device may receive particular input content, as described above.

As further shown in FIG. 5, process 500 may include processing the particular input content, with the first trained machine learning model, to generate a first model result (block 550). For example, the device may process the particular input content, with the first trained machine learning model, to generate a first model result, as described above.

As further shown in FIG. 5, process 500 may include processing the particular input content, with the second trained machine learning model, to generate a second model result (block 560). For example, the device may process the particular input content, with the second trained machine learning model, to generate a second model result, as described above.

As further shown in FIG. 5, process 500 may include processing the particular input content, with the third trained machine learning model, to generate a third model result (block 570). For example, the device may process the particular input content, with the third trained machine learning model, to generate a third model result, as described above.

As further shown in FIG. 5, process 500 may include processing the first model result, the second model result, and the third model result, with an aggregation model, to generate a detection result indicating whether the particular input content is a deepfake or is real (block 580). For example, the device may process the first model result, the second model result, and the third model result, with an aggregation model, to generate a detection result indicating whether the particular input content is a deepfake or is real, as described above.

As further shown in FIG. 5, process 500 may include performing one or more actions based on the detection result (block 590). For example, the device may perform one or more actions based on the detection result, as described above.

Process 500 may include additional implementations, such as any single implementation or any combination of implementations described below and/or in connection with one or more other processes described elsewhere herein.

In a first implementation, preprocessing the training data to generate the preprocessed training data includes extracting frames from the input content; extracting images of faces from the frames; returning facial landmarks, associated with the images of the faces, to the frames; and adding perturbations to the frames, after returning the facial landmarks, to generate the preprocessed training data.

In a second implementation, alone or in combination with the first implementation, adding the perturbations to the frames includes cropping outer pixels of the images of the faces and replacing the cropped outer pixels with a border or resizing the images of the faces based on the cropped outer pixels.

In a third implementation, alone or in combination with one or more of the first and second implementations, each of the first model result, the second model result, and the third model result provides an indication of whether the particular input content is a deepfake or is real.

In a fourth implementation, alone or in combination with one or more of the first through third implementations, the first machine learning model is a full-face image convolutional neural network (CNN) model, the second machine learning model is a partial image CNN model, and the third machine learning model is a support vector machine learning model.

In a fifth implementation, alone or in combination with one or more of the first through fourth implementations, the aggregation model is a logistic regression machine learning model.

In a sixth implementation, alone or in combination with one or more of the first through fifth implementations, the first model result is a first probability that the particular input content is a deepfake and the second model result is a second probability that the particular input content is a deepfake.

In a seventh implementation, alone or in combination with one or more of the first through sixth implementations, processing the input content, with the third machine learning model, to generate the third model result includes processing the input content, with the third machine learning model, to generate a plurality of binary predictions that the input content is a deepfake, and averaging the plurality of binary predictions to determine a probability that the input content is a deepfake, wherein the third model result corresponds to the probability.

In an eighth implementation, alone or in combination with one or more of the first through seventh implementations, performing the one or more actions includes one or more of providing the detection result for display or retraining one or more of the first machine learning model, the second machine learning model, or the third machine learning model based on the detection result.

In a ninth implementation, alone or in combination with one or more of the first through eighth implementations, performing the one or more actions includes one or more of generating and providing a notification to a law enforcement agency when the detection result indicates that the input content is a deepfake or generating and providing a notification to an entity associated with the input content when the detection result indicates that the input content is a deepfake.

In a tenth implementation, alone or in combination with one or more of the first through ninth implementations, performing the one or more actions includes correcting the input content to remove deepfake content and to generate modified input content and utilizing the modified input content.

In an eleventh implementation, alone or in combination with one or more of the first through tenth implementations, performing the one or more actions includes preventing a financial transaction when the detection result indicates that the input content is a deepfake of a credential required for performing the financial transaction.

In a twelfth implementation, alone or in combination with one or more of the first through eleventh implementations, the detection result is a binary result with a first value indicating that the input content is a deepfake and a second value indicating that the input content is real.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, training data that includes input content for training machine learning models that include a first machine learning model, a second machine learning model, and a third machine learning model,
wherein the first machine learning model is a full-face image convolutional neural network (CNN) model,
wherein the second machine learning model is a partial image CNN model, and
wherein the third machine learning model is a support vector machine learning model;
preprocessing, by the device, the training data to generate preprocessed training data;
training, by the device, the machine learning models, with the preprocessed training data, to generate trained machine learning models that include a first trained machine learning model, a second trained machine learning model, and a third trained machine learning model;
receiving, by the device, particular input content;
processing, by the device, the particular input content, with the first trained machine learning model, to generate a first model result;
processing, by the device, the particular input content, with the second trained machine learning model, to generate a second model result;
processing, by the device, the particular input content, with the third trained machine learning model, to generate a third model result;
processing, by the device, the first model result, the second model result, and the third model result, with an aggregation model, to generate a detection result indicating whether the particular input content is a deepfake or is real; and
performing, by the device, one or more actions based on the detection result.

2. The method of claim 1, wherein preprocessing the training data to generate the preprocessed training data comprises:
extracting frames from the input content;
extracting images of faces from the frames;
returning facial landmarks, associated with the images of the faces, to the frames; and
adding perturbations to the frames, after returning the facial landmarks, to generate the preprocessed training data.

3. The method of claim 2, wherein adding the perturbations to the frames comprises:
cropping outer pixels of the images of the faces; and
replacing the cropped outer pixels with a border or resizing the images of the faces based on the cropped outer pixels.

4. The method of claim 1, wherein each of the first model result, the second model result, and the third model result provides an indication of whether the particular input content is a deepfake or is real.

5. The method of claim 1, wherein the aggregation model is a logistic regression machine learning model.

6. The method of claim 1, wherein the first model result is a first probability that the particular input content is a deepfake and the second model result is a second probability that the particular input content is a deepfake.

7. A device, comprising:
one or more memories; and
one or more processors, coupled to the one or more memories, configured to:
receive input content;
process the input content, with a first machine learning model, to generate a first model result;
process the input content, with a second machine learning model, to generate a second model result;
process the input content, with a third machine learning model, to generate a third model result;
process the first model result, the second model result, and the third model result, with an aggregation model, to generate a detection result indicating whether the input content is a deepfake or is real; and
perform one or more actions based on the detection result,
wherein the first machine learning model is a full-face image convolutional neural network (CNN) model,
wherein the second machine learning model is a partial image CNN model, and
wherein the third machine learning model is a support vector machine learning model.

8. The device of claim 7, wherein the one or more processors, to process the input content, with the third machine learning model, to generate the third model result, are configured to:
process the input content, with the third machine learning model, to generate a plurality of binary predictions that the input content is a deepfake; and
average the plurality of binary predictions to determine a probability that the input content is a deepfake,
wherein the third model result corresponds to the probability.

9. The device of claim 7, wherein the one or more processors, to perform the one or more actions, are configured to one or more of:
provide the detection result for display; or
retrain one or more of the first machine learning model, the second machine learning model, or the third machine learning model based on the detection result.

10. The device of claim 7, wherein the one or more processors, to perform the one or more actions, are configured to one or more of:
generate and provide a notification to a law enforcement agency when the detection result indicates that the input content is a deepfake; or
generate and provide a notification to an entity associated with the input content when the detection result indicates that the input content is a deepfake.

11. The device of claim 7, wherein the one or more processors, to perform the one or more actions, are configured to:
correct the input content to remove deepfake content and to generate modified input content; and
utilize the modified input content.

12. The device of claim 7, wherein the one or more processors, to perform the one or more actions, are configured to:

prevent a financial transaction when the detection result indicates that the input content is a deepfake of a credential required for performing the financial transaction.

13. The device of claim 7, wherein the detection result is a binary result with a first value indicating that the input content is a deepfake and a second value indicating that the input content is real.

14. The device of claim 7, wherein the aggregation model is a logistic regression machine learning model.

15. A non-transitory computer-readable medium storing a set of instructions, the set of instructions comprising:
one or more instructions that, when executed by one or more processors of a device, cause the device to:
receive input content;
process the input content, with a first machine learning model, to generate a first model result;
process the input content, with a second machine learning model, to generate a second model result;
process the input content, with a third machine learning model, to generate a third model result,
wherein the first machine learning model, the second machine learning model, and the third machine learning model are trained based on training data that includes preprocessed historical input content,
wherein the first machine learning model is a full-face image convolutional neural network (CNN) model,
wherein the second machine learning model is a partial image CNN model, and
wherein the third machine learning model is a support vector machine learning model;
process the first model result, the second model result, and the third model result, with an aggregation model, to generate a detection result indicating whether the input content is a deepfake or is real; and
perform one or more actions based on the detection result.

16. The non-transitory computer-readable medium of claim 15, wherein the preprocessed historical input content includes perturbations.

17. The non-transitory computer-readable medium of claim 15, wherein the first model result is a first probability that the input content is a deepfake and the second model result is a second probability that the input content is a deepfake.

18. The non-transitory computer-readable medium of claim 15, wherein the one or more instructions, that cause the device to process the input content, with the third machine learning model, to generate the third model result, cause the device to:
process the input content, with the third machine learning model, to generate a plurality of binary predictions that the input content is a deepfake; and
average the plurality of binary predictions to determine a probability that the input content is a deepfake,
wherein the third model result corresponds to the probability.

19. The non-transitory computer-readable medium of claim 15, wherein the one or more instructions, that cause the device to perform the one or more actions, cause the device to one or more of:
provide the detection result for display;
retrain one or more of the first machine learning model, the second machine learning model, or the third machine learning model based on the detection result;
generate and provide a notification to a law enforcement agency when the detection result indicates that the input content is a deepfake; or
generate and provide a notification to an entity associated with the input content when the detection result indicates that the input content is a deepfake.

20. The non-transitory computer-readable medium of claim 15, wherein the one or more instructions, that cause the device to perform the one or more actions, cause the device to:
correct the input content to remove deepfake content and to generate modified input content; and
utilize the modified input content.

* * * * *